US011903109B2

United States Patent

Lai et al.

(12) United States Patent
(10) Patent No.: US 11,903,109 B2
(45) Date of Patent: *Feb. 13, 2024

(54) DIMMING CONTROL METHOD, DIMMING CONTROL CIRCUIT AND POWER CONVERTER THEREOF

(71) Applicant: Silergy Semiconductor Technology (Hangzhou) LTD, Hangzhou (CN)

(72) Inventors: Hongbin Lai, Hangzhou (CN); Jianxin Wang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/087,931

(22) Filed: Dec. 23, 2022

(65) Prior Publication Data

US 2023/0131575 A1 Apr. 27, 2023

Related U.S. Application Data

(63) Continuation of application No. 16/940,573, filed on Jul. 28, 2020, now Pat. No. 11,540,373.

(30) Foreign Application Priority Data

Aug. 9, 2019 (CN) ......................... 201910733096.5

(51) Int. Cl.

| | |
|---|---|
| ***H05B 45/3725*** | (2020.01) |
| ***H05B 45/10*** | (2020.01) |
| ***H05B 45/325*** | (2020.01) |

(52) U.S. Cl.

CPC ......... *H05B 45/3725* (2020.01); *H05B 45/10* (2020.01); *H05B 45/325* (2020.01)

(58) Field of Classification Search

CPC ... H05B 45/10; H05B 45/325; H05B 45/3725

See application file for complete search history.

(56) References Cited

U.S. PATENT DOCUMENTS

| | | | |
|---|---|---|---|
| 6,075,716 | A | 6/2000 | He et al. |
| 6,385,057 | B1 | 5/2002 | Barron |
| 8,471,488 | B1 | 6/2013 | Hopkins et al. |
| 9,077,260 | B2 | 7/2015 | Zhao et al. |
| 9,124,169 | B2 | 9/2015 | Garlow et al. |
| 9,525,336 | B2 | 12/2016 | Huang |
| 2009/0243398 | A1 | 10/2009 | Yohanan et al. |
| 2015/0207398 | A1 | 7/2015 | Proca |
| 2015/0216007 | A1 | 7/2015 | Ferrara et al. |

(Continued)

FOREIGN PATENT DOCUMENTS

| | | | |
|---|---|---|---|
| CN | 108093534 A | 5/2008 | |
| CN | 103763830 A * | 4/2014 | ......... H05B 33/0815 |

(Continued)

OTHER PUBLICATIONS

Machine Translation of CN107070213A (Year: 2017).*

*Primary Examiner* — Raymond R Chai

(57) ABSTRACT

A method of controlling a power convertor to perform diming control for a light-emitting diode (LED) load, can include: adjusting a length of a switching period of the power converter in accordance with a dimming signal; and controlling the power converter to generate a drive current corresponding to the dimming signal.

20 Claims, 4 Drawing Sheets

(56) References Cited

U.S. PATENT DOCUMENTS

| | | | | |
|---|---|---|---|---|
| 2018/0007753 | A1 * | 1/2018 | Kuang .................. | H05B 45/10 |
| 2018/0007754 | A1 * | 1/2018 | Kuang .................. | H05B 45/10 |

FOREIGN PATENT DOCUMENTS

| | | | | | |
|---|---|---|---|---|---|
| CN | 103763830 | A | | 4/2014 | |
| CN | 107070213 | A | * | 8/2017 | ............ H02M 3/156 |
| CN | 107070213 | A | | 8/2017 | |
| CN | 109195247 | A | * | 1/2019 | ........ H02M 3/33507 |
| CN | 111628658 | A | * | 9/2020 | |
| CN | 111628658 | A | | 9/2020 | |
| CN | 109195247 | A | | 12/2020 | |
| WO | 2018114322 | A1 | | 6/2018 | |
| WO | WO-2018114322 | A1 | * | 6/2018 | ............ H02M 4/086 |

* cited by examiner

DIMMING CONTROL METHOD, DIMMING CONTROL CIRCUIT AND POWER CONVERTER THEREOF

RELATED APPLICATIONS

This application is a continuation of the following application, U.S. patent application Ser. No. 16/940,573, filed on Jul. 28, 2020, and which is hereby incorporated by reference as if it is set forth in full in this specification, and which also claims the benefit of Chinese Patent Application No. 201910733096.5, filed on Aug. 9, 2019, which is incorporated herein by reference in its entirety.

FIELD OF THE INVENTION

The present invention generally relates to the field of power electronics, and more particularly to dimming control methods and circuits, and associated power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
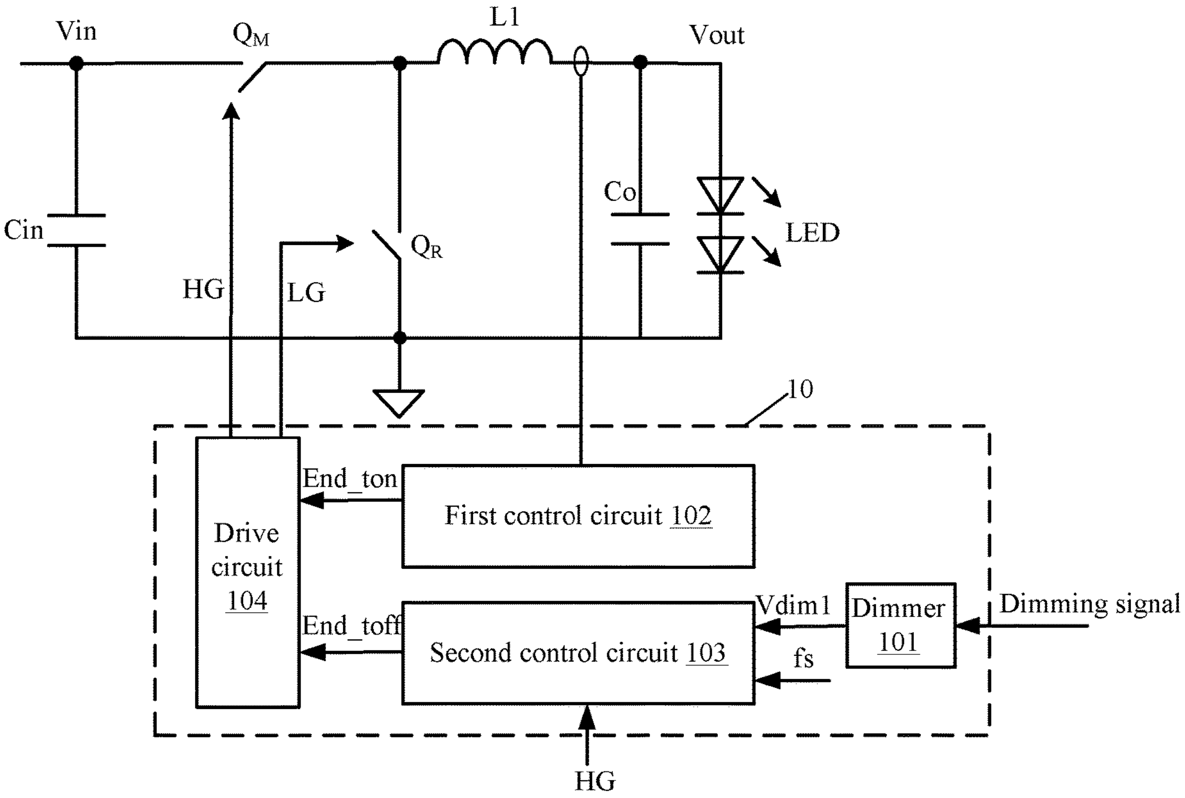
FIG. 1 is a schematic block diagram of a first example power converter with a dimming control circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In lighting applications, light-emitting diode (LED) loads have been widely used because of their low power consumption and fast strobe speed. In existing LED load lighting systems, a power stage circuit of the power converter may be controlled to provide the output current to the LED loads by employing pulse-width modulation (PWM) so as to light the LED loads. Further, the power converter can adjust the brightness of the LED load according to the set value of the dimming signal (e.g., the duty cycle), thereby achieving dimming. Deep or low dimming process may involve dimming the LED loads to approximately a 1% output current level. However, when the set value of the dimming signal is relatively small; that is, when the dimming depth (e.g., a dimming level) is deep or low, current control of the power converter can be lost, as well as the ability to further dim the LED loads. For example, when the dimming level of the LED load is low the output current no longer changes with the dimming signal, which is called "dimming dead zone." Further, the power stage circuit may not be able to provide enough energy to the LED load in time, resulting in poor accuracy of the output current and visible flickering of the LED loads. Therefore, in some low dimming applications, due to the small set value of the dimming signal and deep dimming level, current error can be accumulated when the dimming level is very low or the set value of the dimming signal is very small, thereby limiting the dimming depth and a range of dimming control.

In particular embodiments, a dimming control method can include controlling a power converter to perform diming control for an LED load. In certain embodiments, a length of a switching period of the power converter can be adjusted according to a dimming signal, such that the power converter may generate a drive current corresponding to the dimming signal. The drive current may be utilized to provide energy for a light source (e.g., an LED). The power converter can include a power stage circuit, and the power stage circuit can be controlled according to the dimming signal to provide energy to the LED.

In one embodiment, the switching period can include first and second time intervals. During the first time interval, the switching state of the power stage circuit can be adjusted according to a first compensation signal that characterizes an error between a sampling signal of the drive current and a current reference signal. During the second time interval, the switching state of the power stage circuit can be adjusted according to a second compensation signal to control the on-time of the power switch of the power stage circuit. Here, the current reference signal may correspond to a desired drive current. In one embodiment, the second compensation signal may be consistent with (e.g., the same as) the first compensation signal that is generated at an end moment of the first time interval, and the current reference signal may not participate in the adjustment of the power stage circuit in the second time interval.

The power converter can adjust a length of the second time interval according to a first adjustment signal that is correlated to the dimming signal to achieve the adjustment of the switching period. In one embodiment, the first adjustment signal may be representative of the dimming depth (e.g., dimming level) of the dimming signal. In this embodiment, the length of the first time interval can be controlled by a clock signal, and the length of the second time interval is adjusted according to the dimming signal. The active level (e.g., high logic level) interval of the clock signal can correspond to the first time interval. For example, the length of the first time interval can be determined by the maximum set value of the dimming signal.

In certain embodiments, a second adjustment signal is generated according to the dimming signal and the first adjustment signal. The power converter can adjust the length of the switching period according to the first adjustment signal, and may adjust the current reference signal according to the second adjustment signal, such that the on-time of the power switch can be adjusted according to the error between the sampling signal representative of the drive current and the current reference signal, in order to obtain the drive current corresponding to the dimming signal. This dimming method may achieve combined dimming for the light source and improving the dimming depth.

In one embodiment, when the set value of the dimming signal is the maximum value, the power stage converter may correspondingly operate in a minimum switching period, and the length of the minimum switching period can be equal to the length of the first time interval. At this time, the drive current may correspond to the maximum dimming depth or the dimming level of the dimming signal, and the LED load can be adjusted to the brightest. When the set value of the dimming signal is reduced from the maximum value, the power stage converter can adjust the length of the second time interval according to a set value of the dimming signal so as to obtain the drive current corresponding to different dimming levels of the dimming signal. In this way, the brightness of the LED load can correspondingly vary with the set value of the dimming signal.

In particular embodiments, the dimming signal is an analog signal or a PWM signal. For example, the dimmer can convert a received PWM dimming signal or analog dimming signal into a PWM signal with a varying duty cycle. When the dimming signal is an analog signal, the dimming signal can be converted into PWM dimming signal with a fixed frequency and a duty cycle varying with the amplitude of the analog signal. The duty cycle of the PWM dimming signal may represent the set value of the dimming signal. For example, the PWM dimming signal with 100% duty cycle may control the brightness of the LED load to 100%, and the PWM dimming signal with 10% duty cycle may control the brightness of the LED load to 10%, and so on.

Referring now to FIG. 1, shown is a schematic block diagram of a first example power converter with a dimming control circuit, in accordance with embodiments of the present invention. This example power converter can include a power stage circuit and dimming control circuit 10. The power stage circuit is configured as a Buck topology, and can include input capacitor Cin, power switch $Q_M$, inductor L1, power switch $Q_R$, and output capacitor Co. A first power terminal of power switch $Q_M$ can connect to an input terminal of the power converter. A first terminal of inductor L1 can connect to a second power terminal of power switch $Q_M$, and a second terminal of inductor L1 can connect an output terminal of the power converter. A first power terminal of power switch $Q_R$ can connect to the first terminal of inductor L1, and a second terminal of power switch $Q_R$ can connect to a reference ground of the power converter. Here, the switching states of power switches $Q_M$ and $Q_R$ are complementary. Input capacitor Cin can connect to the input terminal of the power converter so as to smooth an input current or input voltage Vin. Output capacitor Co can connect to the output terminal of the power converter so as to smooth an output current or output voltage Vout, and can connect in parallel with an LED load to provide energy storage. Dimming control circuit 10 can adjust a length of a switching period of the power converter according to a dimming signal in order to obtain a drive current corresponding to the dimming level of the dimming signal, thereby dimming the LED load.

The switching period can include first and second time intervals. Dimming control circuit 10 may realize time-sharing control in different time intervals. Dimming control circuit 10 can receive clock signal fs to control the length of the first time interval. The length of the second time interval can be adjusted according to the dimming signal. In certain embodiments, the length of the first time interval is the length of the active level interval of clock signal fs. For example, the length of the high level interval of clock signal fs can be configured as the length of the first time interval. Further, the length of the first time interval can be set in accordance with the maximum set value of the dimming signal.

Dimming control circuit 10 can include dimmer 101, control circuit 102, and control circuit 103. Dimmer 101 can receive the dimming signal and generate adjustment signal Vdim1 related to the dimming signal. In this example, adjustment signal Vdim1 may represent the dimming level of the dimming signal, and the duty cycle of adjustment signal Vdim1 may correspond to the set value of the dimming signal. That is, the change tendency of the duty cycle of adjustment signal Vdim1 may be consistent with the change tendency of the duty cycle of the PWM dimming signal or the voltage set value of the analog dimming signal. For example, the set values of the dimming signal are 100%, 50%, and 10%, and different set values of the dimming signal can indicate different dimming levels or depth of the dimming signal Dimmer 101 can be implemented by a microcontroller unit (MCU), which can obtain the set value of the dimming signal by detecting an external PWM dimming signal or an analog dimming signal, and may generate the adjustment signal with a corresponding duty cycle. It should be understood that dimmer 101 may also implement the above-mentioned functions through a digital circuit or other suitable circuitry.

For example, control circuit 102 coupled to the output terminal of the power converter can sample the drive current, and may generate control signal End_ton according to a sampling signal representative of the drive current and a current reference signal, in order to adjust the switching states of the power switches of the power stage circuit. Control circuit 103 can generate control signal End_toff according to adjustment signal Vdim1 to adjust the length of the second time interval, thereby adjusting the switching period. In this example, dimming control circuit 10 can also include drive circuit 104. Drive circuit 104 can generate drive signals HG and LG according to control signal End_ton and control signal End_toff to control the on and off states of power switches $Q_M$ and $Q_L$, respectively.

For example, control circuit 102 can control the power switches according to the current reference signal, such that the power stage circuit can provide energy to the LED load from the input terminal by a closed loop control mode. Here, the current reference signal is a fixed value, and can determine the duty cycles of the power switches, which sets the amplitude of the drive current to a desired drive current. For example, control circuit 102 may adopt peak current mode control, and adjust the on-time of power switch $Q_M$ by comparing the sampling signal and a compensation signal that characterizes an error between the sampling signal and the current reference signal. It should be understood that control circuit 102 may also adopt constant on-time mode control or other methods to achieve adjustment of the on-time of power switch $Q_M$.

In another example, control circuit 102 can control the power switches to provide energy to the LED load by a closed loop control mode during the first time interval, and control the power switches to provide energy to the LED load by an open loop control mode during the second time interval. Further, during the first time interval, control circuit 102 can control the switching states of the power switches according to a first compensation signal that characterizes the error between the sampling signal of the drive current and the current reference signal. In the second time interval, the switching states of the power switches can be adjusted according to a second compensation signal. Here, the current reference signal corresponds to the desired drive current. In this example, the second compensation signal can be consistent with the first compensation signal this is generated at the end moment of the first time interval. For example, in the first time interval, control circuit 102 can sample the first compensation signal, and in the second time interval, control circuit 102 may hold the first compensation signal as the second compensation signal, in order to control the on-time of power switch $Q_M$. In this way, during the second time interval of the switching period, the output signal of the power converter may no longer affect the compensation signal, and the current reference signal may not participate in the adjustment of the switching states of the power switches. Therefore, during the second time interval, the problem of poor output current accuracy can be avoided, and the output current accuracy can be improved. Here, the problem of poor output current accuracy can be caused by the limited response time of the internal amplifier, and nonlinear relationship between the current reference signal and the dimming signal, and so on.

In particular embodiments, control circuit 103 can adjust the length of the second time interval of the switching period according to adjustment signal Vdim1 correlated to the dimming signal, such that the power converter can generate the drive current corresponding to the dimming signal so as to dim the LED load. In one example, the power converter may operate in a discontinuous conduction mode (DCM), and an inductor current flowing through inductor L1 may drop to zero during the first time interval of the switching period. During the second time interval, the inductor current may remain at zero. In this way, control circuit 103 can adjust a length of the time interval in which the inductor current remains at zero according to adjustment signal Vdim1, in order to regulate the length of the switching period.

Further, the length of the first time interval of the switching period may correspond to the maximum set value of the dimming signal, and the length of the second time interval may vary with the dimming signal. When a set value of the dimming signal is decreased, the length of the switching period can be controlled to be increased correspondingly to decrease the drive current, and vice versa. In this example, a larger set value of the dimming signal may correspond to a larger duty cycle of the first adjustment signal. In some applications, the duty cycle of the dimming signal and the first adjustment signal may also be inversely proportional. Thus, by adjusting the second time interval of the switching cycle in the opposite manner, the length of the switching period can be adjusted. Further, the power converter in certain embodiments may be a BOOST, FLYBACK, or a power converter of any other suitable topology.

Figure 2:
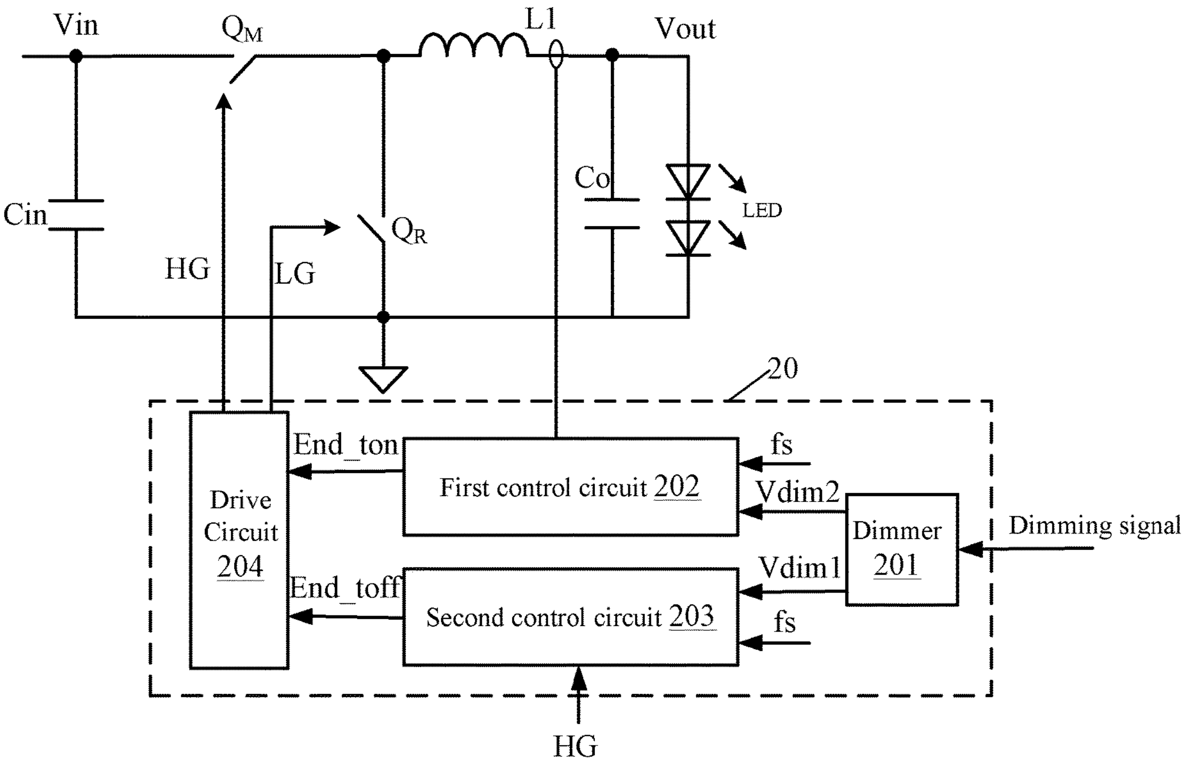
FIG. 2 is a schematic block diagram of a second example power converter with a dimming control circuit, in accordance with embodiments of the present invention.

Referring now to FIG. 2, shown is a schematic block diagram of a second example power converter with a dimming control circuit, in accordance with embodiments of the present invention. In this particular example, dimming control circuit 20 may respectively adjust the on-time of the power switch of the power stage circuit and the length of the switching period according to the dimming signal, thereby generating the drive current corresponding to the dimming signal, in order to dim the LED load. Dimmer 201 can generate adjustment signals Vdim1 and Vdim2 according to the dimming signal. It should be understood that the duty cycles of adjustment signals Vdim1 and Vdim2 may be equal or unequal. When the duty cycles of adjustment signals Vdim1 and Vdim2 are not equal, adjustment signals Vdim1 and Vdim2 may correspond to different dimming levels of the dimming signal. Dimming control circuit 20 can include control circuits 202 and 203. Both of control circuits 202 and 203 can receive clock signal fs to control the length of the first time interval of the switching period.

In one embodiment, control circuit 102 can control the power switches to provide energy to the LED load by a closed loop control mode during the first time interval, and may control the power switches to provide energy to the LED load by an open loop control mode during the second time interval. Further, control circuit 202 can control the switching states of the power switches during the first time interval according to a first compensation signal that characterizes the error between the sampling signal of the drive current and the current reference signal. During the second time interval, the switching states of the power switches can be adjusted according to the second compensation signal. Here, the current reference signal may be generated according to adjustment signal Vdim2 and the desired drive current corresponding to the dimming signal.

In one example, the second compensation signal can be consistent with the first compensation signal, which can be generated at the end moment of the first time interval. For example, in the first time interval, control circuit 202 may sample the first compensation signal, and during the second time interval may hold the first compensation signal. Then, the first compensation signal can be utilized as the second compensation signal to control the on-time of the power switch, such that during the second time interval of the switching period the output signal of the power converter may no longer affect the compensation signal, and the current reference signal may not participate in the adjustment of the switching states of the power switches. Therefore, during the second time interval, the problem of poor output current accuracy can be avoided, and the output current accuracy can be improved. Here, the problem of poor output current accuracy can be caused by the limited response time of the internal amplifier, and a nonlinear relationship between the current reference signal and the dimming signal, and so on.

In certain embodiments, control circuit 203 can receive adjustment signal Vdim1, and adjust the switching states of the power switches according to adjustment signal Vdim1 in order as to adjust the length of the second time interval, thereby adjusting the switching period. For example, the first time interval of the switching period of the power converter can be set according to the particular application environment. For example, control circuit 203 may adjust the length of the second time interval by comparing first and second ramp signals, where the first ramp signal may be set according to the length of the first time interval, and the second ramp voltage may be set according to the duty cycle of adjustment signal Vdim1. With different circuit setting approaches, the setting conditions for the length of the first time interval may also be different. For example, since the sampling signal representative of the drive current in the first time interval may represent the variation range of the inductor current during the entire switching period, the length of the first time interval can be set according to the maximum set value of the dimming signal as a preferred embodiment.

In certain embodiments, the set value of adjustment signal Vdim2 may be generated according to the set value of the dimming signal and adjustment signal Vdim1. Further, the product of the duty cycles of adjustment signals Vdim1 and Vdim2 may be proportional to the duty cycle of the dimming signal corresponding to the dimming level. For example, when the set value of the dimming signal is 10%; that is, the dimming depth (e.g., dimming level) corresponding to the dimming signal is 0.1, adjustment signal Vdim1 and second adjustment signal Vdim2 may be set to different duty cycles. For example, the duty cycle of adjustment signal Vdim1 may be 0.2, and the duty cycle of adjustment signal Vdim2 may be 0.5. It should be understood that both the set values of the first and second adjustment signals (e.g., Vdim1 and Vdim2) may represent the dimming depth of the dimming signal, and the duty cycles of the first and second adjustment signals may be respectively set according to the dimming depth of the dimming signal. Particular embodiments can separately adjust the switching period and duty cycle of the power switch of the power stage circuit by combining two adjustment signals generated according to the dimming depth of the dimming signal, thereby achieving combined dimming and improving the dimming depth.

Particular embodiments may adjust the length of the switching period of the power converter according to the dimming signal by utilizing the second control circuit. Further, the first control circuit (e.g., 202) can control the switching states of the power switches according to the output signal of the power stage converter, or controlling the switching states of the power switches according to the dimming signal. This can avoid the problem of poor output current accuracy caused by factors such as the non-linear relationship between the current reference signal and the dimming signal and the limited response time of the internal amplifier, and improve the output current accuracy, while achieving combined dimming to improve the dimming depth and widen the dimming range.

Figure 3:
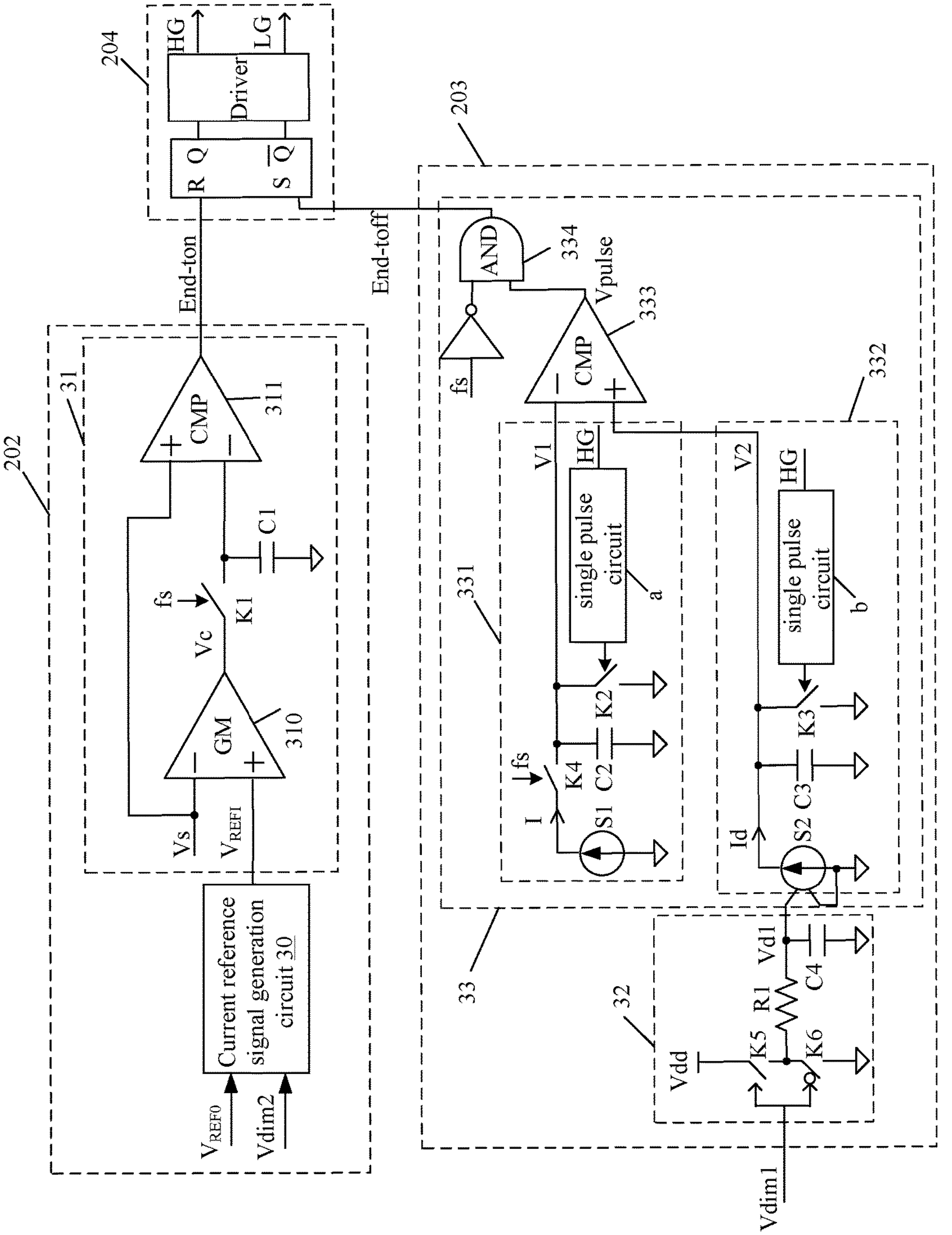
FIG. 3 is a schematic block diagram of an example dimming control circuit, in accordance with embodiments of the present invention.

Referring now to FIG. 3, shown is a schematic block diagram of an example dimming control circuit, in accordance with embodiments of the present invention. This example dimming control circuit 20 can include control circuits 202 and 203. Control circuit 202 can adjust current reference signal VREF1 according to adjustment signal Vdim2 so as to control the switching states of the power switches. Control circuit 203 can adjust the length of the switching period of the power converter according to adjustment signal Vdim1, such that the drive current flowing through the LED load may correspond to the dimming depth of the dimming signal, thereby achieving combined dimming and improving dimming depth.

In particular embodiments, control circuit 202 can include current reference signal generation circuit 30 and current mode control circuit 31. Current reference signal generation circuit 30 can receive reference signal VREF0 and adjustment signal Vdim2, and may generate current reference signal VREF1. In this example, current reference signal VREF1 may be correlated to the duty cycle of adjustment signal Vdim2. Further, current reference signal VREF1 may have a proportional relationship with the duty cycle of adjustment signal Vdim2. For example, current reference signal VREF1 can be the product of reference signal VREF0 and the duty cycle of adjustment signal Vdim2, which can be expressed as: VREF1=VREF0*Vd2, where Vd2 may represent the duty cycle of adjustment signal Vdim2. It should be understood that although the above describes that current reference signal generation circuit 30 may adopt a multiplier to provide the current reference signal correlated to the duty cycle of adjustment signal Vdim2, those skilled in the art will recognize that other suitable circuit structures that can achieve the above functions can be also applied in particular embodiments.

Current mode control circuit 31 can include transconductance operational amplifier 310, switch K1, capacitor C1, and comparison circuit 311. A non-inverting input terminal of transconductance operational amplifier 310 can receive current reference signal VREF1, and an inverting input terminal of transconductance operational amplifier 310 can receive sampling signal Vs representative of the drive current. Compensation signal Vc can be generated in accordance with an error between sampling signals Vs and reference signal VREF1. A first terminal of switch K1 can connect to an output terminal of transconductance operational amplifier 310, a second terminal of switch K1 can connect to comparison circuit 311, and a control terminal of switch K1 can receive clock signal fs. Capacitor C1 can connect between the second terminal of switch K1 and a reference ground. The non-inverting input terminal of comparison circuit 311 can receive sampling signal Vs, and the inverting input terminal of comparison circuit 311 can connect to the second terminal of switch K1. By comparing sampling Vs against an input signal at the second input terminal of comparison circuit 311, control signal End_ton can be generates at an output terminal of comparison circuit 311.

In the first time interval of the switching period (e.g., when clock signal fs is high), switch K1 is closed, capacitor C1 can sample and hold compensation signal Vc, and compensation signal Vc can be input to the second input terminal of comparator circuit 311. Thus, comparison circuit 311 can generate control signal End_ton by comparing sampling signal Vs against compensation signal Vc so as to adjust the on time of power switch $Q_M$ and the off time of power switch $Q_R$. In the second time interval of the switching period (e.g., when clock signal fs is low), switch K1 is turned off, and capacitor C1 may hold compensation signal Vc, which can be sampled at the end moment of the first time interval. A sampling value of compensation signal Vc can be input to the second input terminal of comparison circuit 311, and comparison circuit 311 can generate control signal End_ton by comparing sampling signal Vs against the sampling value of compensation signal Vc.

In this way, during the second time interval of the switching period, the output signal of the power converter may no longer affect the compensation signal, and the current reference signal may not participate in the adjustment of the switching states of the power switches. This can avoid the problem of poor output current accuracy caused by factors such as the non-linear relationship between the current reference signal and the dimming signal and the limited response time of the internal amplifier when the set value of the dimming signal is small, and improve the output current accuracy, while achieving combined dimming to improve the dimming depth and widen the dimming range.

In particular embodiments, control circuit 203 can include duty cycle detection circuit 32 and control signal generation circuit 33. Duty cycle detection circuit 32 can receive adjustment signal Vdim1, and detect the duty cycle of adjustment signal Vdim1, in order to generate duty cycle signal Vd1. Control signal generating circuit 33 can receive duty cycle signal Vd1 and clock signal fs, and may generate control signal End_toff to control the off time of power switch $Q_M$ and the on time of power switch $Q_R$, in order to adjust the length of the switching period.

In particular embodiments, duty cycle detection circuit 32 can include switches K5 and K6 connected in series between DC voltage Vdd and the reference ground, and a filter circuit. Switch K5 can be directly controlled to be turned on or off by adjustment signal Vdim1, and switch K6 can be directly controlled to be turned on or off by an inverted signal of adjustment signal Vdim1, such that the switch states of switches K5 and K6 are complementary. For example, adjustment signal Vdim1 can connect to the control terminal of switch K6 through an inverter. When adjustment signal Vdim1 is at a high level, switch K5 can be turned on. Further, DC voltage Vdd can charge capacitor C4. When adjustment signal Vdim1 is at a low level, switch K6 can be turned on, and capacitor C4 can discharge to the reference ground. The filter circuit can connect to the common node of switches K5 and K6, and may filter the output signal at the common node of switches K5 and K6, in order to generate stable duty cycle signal Vd. Further, the filter circuit can include resistor R1 and capacitor C4 connected in series, and may generate duty signal Vd1 at a common node of resistor R1 and capacitor C4. It should be understood that duty cycle detection circuit 32 may also use only a filter circuit to obtain duty cycle signal Vd1, and duty cycle signal Vd1 may also vary along with the duty cycle of adjustment signal Vdim1.

In particular embodiments, control signal generation circuit 33 can include ramp signal generation circuits 331 and 332, and comparison circuit 333. Ramp signal generating circuit 331 can receive clock signal fs, and may control ramp signal V1 to rise at a first slope during the first time interval of the switching period. During the second time interval, ramp signal generating circuit 331 can hold a value of ramp signal V1, which can be generate at the end moment of the first time interval. Ramp signal generating circuit 332 can receive duty cycle signal Vd1, and may control ramp signal V2 to rise at a second slope during the first time interval and the second time interval of the switching period. The inverting input terminal of comparison circuit 333 can receive ramp signal V1, and the non-inverting input terminal of comparison circuit 333 can receive ramp signal V2. When ramp signal V2 rises from zero to ramp signal V1, comparison circuit 333 can generate pulse signal Vpulse. Control signal generating circuit 33 can generate control signal End_toff based on pulse signal Vpulse and clock signal fs. In this example, control signal generating circuit 33 can also include AND-gate 334. Pulse signal Vpulse and the inverted version of clock signal fs can be logically AND'ed by AND-gate 334 in order to generate control signal End_toff.

In particular embodiments, ramp signal generation circuit 331 can include current source S1, capacitor C2, switch K2, and single pulse circuit "a." Capacitor C2 and switch K2 can connect in parallel between the first input terminal of comparison circuit 333 and the reference ground. Current source S1 can connect in parallel with capacitor C2 and switch K2 through switch K4, and may generate fixed current I. Ramp signal generation circuit 332 can include voltage-controlled current source S2, capacitor C3, switch K3, and single pulse circuit "b." Voltage-controlled current source S2, capacitor C3, and switch K3 can connect in parallel between the second input terminal of comparison circuit 233 and the reference ground. The first control terminal of voltage-controlled current source S2 can receive duty cycle signal Vd1, and the second control terminal of voltage-controlled current source S2 can connect to the reference ground, in order to generate current Id varying with duty cycle signal Vd1 at the output terminal.

When control signal End_ton controls drive signal HG to be an active level (e.g., a high level), single pulse circuit "a" can be triggered to generate a pulse with a predetermined time, such that switch K2 can be turned off after being turned on for the predetermined time. During the first time interval of the switching period, clock signal fs can be at an active level, switch K4 may be turned on, and current I can charge capacitor C2 during the first time interval to generate ramp signal V1 that rises at the first slope. When clock signal fs is switched to an inactive level, switch K4 can be turned off, and ramp signal V1 may be maintained at the value that is generated at the end moment of the first time interval. Therefore, the value of ramp signal V1 can be proportional to the length of the first time interval. Similarly, when control signal End_ton controls drive signal HG to be the active level, single pulse circuit "b" can be triggered to generate a pulse with a predetermined time, such that switch K3 is turned off after being turned on for the predetermined time.

During the first time interval and the second time interval of the switching period, current Id can charge capacitor C3 in order to generate ramp signal V2 that rises at the second slope. Therefore, the slope of ramp signal V2 can be proportional to duty cycle signal Vd1. When ramp signal V2 rises from zero to ramp signal V1, pulse signal Vpulse that is generated by comparison circuit 333 can be activated. When pulse signal Vpulse and the inverted version of clock signal fs are both active, AND-gate 334 can activate control signal End_toff to control power switch $Q_M$ to turn on. When the set value of the dimming signal is decreased, the duty cycle of adjustment signal Vdim1 may be decreased, and current Id controlled by duty cycle signal Vd1 may be relatively small, such that ramp signal V2 rise slowly to ramp signal V1, and the length of the switching period can be controlled to be increased correspondingly to decrease the drive current, and vice versa.

In particular embodiments, dimming control circuit 20 can also include drive circuit 204. Drive circuit 204 can generate drive signals HG and LG according to control signal End_ton and control signal End_toff, in order to control power switches $Q_M$ and $Q_R$ to be turned on and off, respectively. For example, drive circuit 204 can include an RS flip-flop. The reset terminal of the RS flip-flop can receive control signal End_ton, and the set terminal of the RS flip-flop can receive control signal End_toff, in order to generate drive signals HG and LG at the output terminals. It should be understood that in order to enhance the driving capability, a driver or other forms of circuits may be further added between the output terminal of the RS flip-flop and the control terminals of the power switches to better control the power stage circuit.

In particular embodiments, dimming control circuit 20 can also include a clock signal generation circuit for generating clock signal fs. Clock signal fs may have an active level (e.g., a logic high level) with a predetermined time to control the length of the first time interval of the switching period of the power converter. The length of the inactive level (e.g., a logic low level) of clock signal fs may be consistent with the length of the second time interval. Further, the length of the active level of clock signal fs may be determined according to the maximum set value of the dimming signal. That is, the length of the first time interval of the switching period may be determined by the maximum set value of the dimming signal. The length of the invalid level of clock signal fs may be equal to the length of the second time interval of the switching period, such that the period of clock signal fs is equal to the switching period of the power converter. In this example, the clock signal generation circuit can receive drive signal HG, and can control the period of clock signal fs to be equal to the switching period of the power converter. It should be understood that the clock signal generation circuit may adopt an analog circuit, or a combination of analog and digital circuitry to generate clock signal fs.

In particular embodiments, the first control circuit (e.g., 202) can adjust the current reference signal according to adjustment signal Vdim2, thereby adjusting the on-time of the power switch. The second control circuit (e.g., 203) can adjust the length of the second time interval according to adjustment signal Vdim1, thereby adjusting the length of the switching period of the power switch. Therefore, combined dimming can be achieved through adjustment signals Vdim1 and Vdim2 which are correlated to the dimming signal, thereby increasing the dimming depth and broadening the dimming range.

Figure 4:
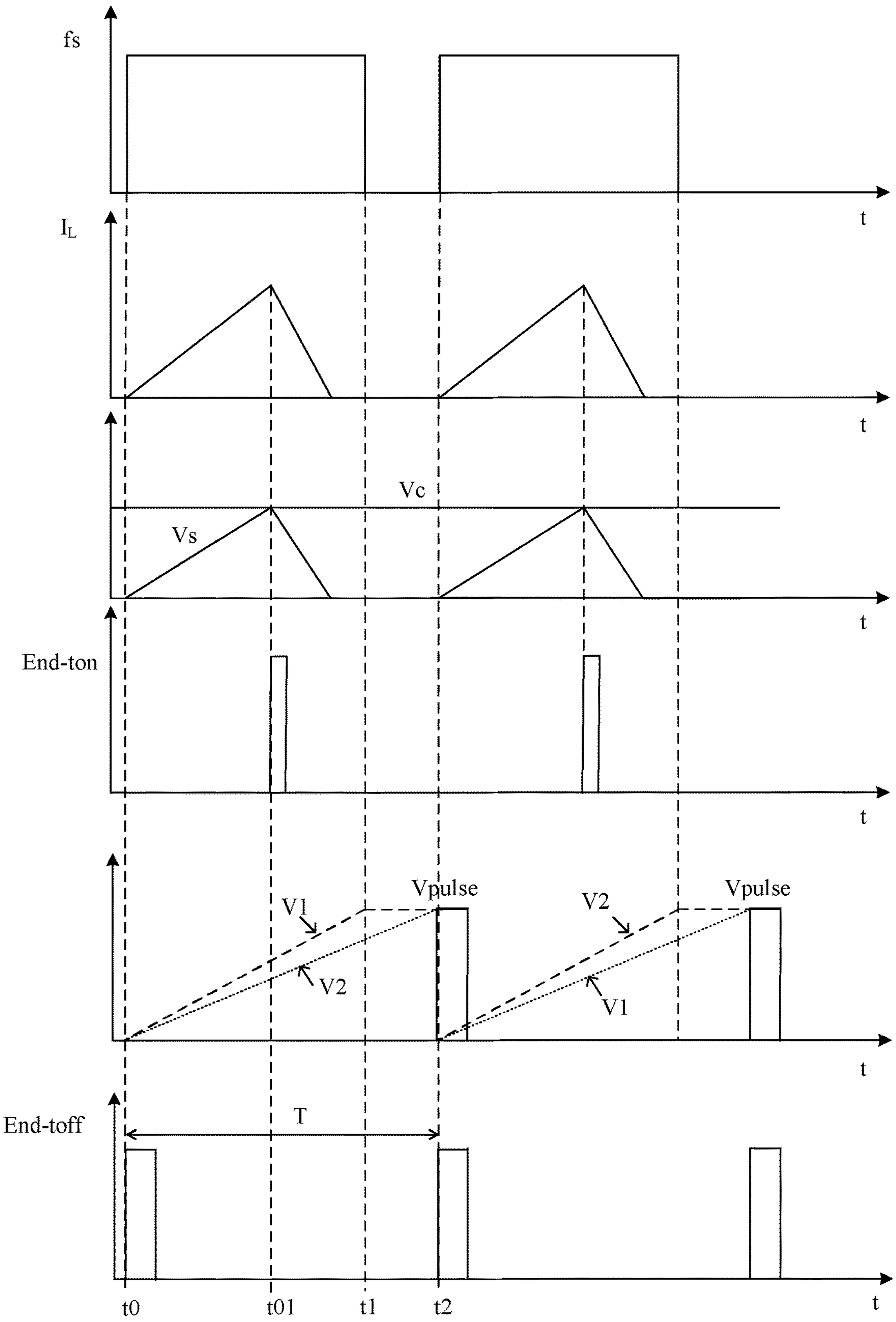
FIG. 4 is a waveform diagram of example operation of the example dimming control circuit, in accordance with embodiments of the present invention.

Referring now to FIG. 4, shown is a waveform diagram of example operation of the example dimming control circuit, in accordance with embodiments of the present invention. In this particular example, switching period T of the power converter can include a first time interval (e.g., t0-t1) and a second time interval (e.g., t1-t2), where the length of first time interval t0-t1 can be controlled by clock signal fs. During first time interval t0-t1, clock signal fs is at a high level, and control circuit 202 can control the power switches of the power stage circuit according to compensation signal Vc and sampling signal Vs of the drive current. For example, the compensation signal Vc may represent an error between current reference signal VREF1 and sampling signal Vs. Ramp signal V1 may start to rise from zero at the first slope during first time interval t0-t1.

Ramp signal V2 may start to rise from zero at the second slope during first time interval t0-t1 and second time interval t1-t2. For example, ramp signal V1 can be correlated to the length of first time interval t0-t1, and the second slope can be correlated to the duty cycle of the first adjustment signal. During the period from t0 to t01, power switch $Q_M$ may be turned on, and inductor current $I_L$ flowing through inductor L1 may rise. At time t01, sampling signal Vs may rise to compensation signal Vc, and control circuit 202 can generate control signal End_ton, in order to control power switch $Q_M$ to turn off and power switch Q to turn on, and inductor current $I_L$ may begin to decrease. During the first time interval, inductor current $I_L$ may gradually decrease to zero. At time t1, clock signal fs may be switched from the high level to a low level, first time interval t0-t1 ends, and ramp signal V1 rises to a maximum value.

During second time interval t1-t2, ramp signal V1 can be maintained at the maximum value which is generated at the end moment of first time interval t0-t1, and control circuit 203 can adjust the off time of power switch $Q_M$ according to adjustment signal Vdim1 in order to adjust the length of second time interval t1-t2. When ramp signal V2 rises to ramp signal V1, pulse signal Vpulse can be generated, and control circuit 203 can generate control signal End_toff according to pulse signal Vpulse, in order to control power switch $Q_M$ to turn on. At the same time, clock signal fs can be switched from the low level to the high level, second time interval t1-t2 ends, a new switching period begins in sequence.

In particular embodiments, the length of the switching period of the power converter can be adjusted according to the dimming signal by utilizing a second control circuit (e.g., 203). Also, control circuit 202 can control the switching states of the power switches of the power stage circuit according to the output signal of the power converter, or may control the switching states of the power switches according to the dimming signal. This can avoid the problem of poor output current accuracy caused by factors such as the non-linear relationship between the current reference signal and the dimming signal and the limited response time of the internal amplifier when the set value of the dimming signal is small, and may improve the output current accuracy, while achieving combined dimming to improve the dimming depth and widen the dimming range.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a power convertor to perform diming control for a light-emitting diode (LED) load, the method comprising:

a) adjusting a length of a time interval in which an inductor current remains at zero, in order to adjust a length of a switching period of the power converter in accordance with a first adjustment signal that is correlated to a dimming signal;

b) controlling the power converter to generate a drive current corresponding to the dimming signal; and c) wherein a duty cycle of the first adjustment signal is greater than a duty cycle of the dimming signal.

2. The method of claim 1, further comprising generating a clock signal using a drive signal of a power switch of the power converter, wherein the switching period of the power converter is equal to a period of the clock signal.

3. The method of claim 1, further comprising adjusting a switching state of a power stage circuit of the power converter in accordance with a first compensation signal that characterizes an error between a sampling signal of the drive current and a current reference signal during a first time interval, wherein the switching period comprises the first time interval and a second time interval.

4. The method of claim 3, further comprising adjusting the switching state of the power stage circuit according to a second compensation signal during the second time interval, wherein the second compensation signal is consistent with the first compensation signal that is generated at an end moment of the first time interval.

5. The method of claim 3, wherein the current reference signal does not participate in adjustment of the switching state of power stage circuit during the second time interval.

6. The method of claim 3, wherein a length of the second time interval is adjusted in accordance with the first adjustment signal.

7. The method of claim 6, further comprising:

a) generating a second adjustment signal in accordance with the first adjustment signal and the dimming signal;

b) adjusting the current reference signal in accordance with the second adjustment signal; and c) adjusting the length of the switching period in accordance with the first adjustment signal, in order to obtain the drive current corresponding to the dimming signal.

8. The method of claim 7, wherein a product of duty cycles of the first adjustment signal and the second adjustment signal is proportional to a duty cycle of the dimming signal corresponding to a dimming level.

9. The method of claim 3, wherein a length of the first time interval is determined by a maximum set value of the dimming signal.

10. The method of claim 6, wherein the length of the second time interval is adjusted by controlling an off time of a power switch of the power stage circuit in accordance with the first adjustment signal.

11. A dimming control circuit for controlling a power converter to perform diming control for a light-emitting diode (LED) load, wherein:

a) a length of a time interval in which an inductor current remains at zero is adjusted, in order to adjust a length of a switching period of the power converter in accordance with a first adjustment signal that is correlated to a dimming signal;

b) the power converter is controlled to generate a drive current corresponding to the dimming signal;

c) when a set value of the dimming signal is decreased, the length of the switching period is controlled to be increased correspondingly to decrease the drive current; and d) wherein a duty cycle of the first adjustment signal is greater than a duty cycle of the dimming signal.

12. The dimming control circuit of claim 11, further comprising a first control circuit configured to control a switching state of a power stage circuit of the power converter in accordance with a first compensation signal that characterizes an error between a current reference signal and a sampling signal of the drive current during a first time interval of the switching period.

13. The dimming control circuit of claim 12, wherein a length of the first time interval is controlled by a lock signal, and the length of the first time interval is determined in accordance with a maximum set value of the dimming signal.

14. The dimming control circuit of claim 12, wherein the switching state of the power stage circuit is controlled in accordance with a second compensation signal during a second time interval of the switching period, and the second compensation signal is consistent with the first compensation signal that is generated at an end moment of the first time interval.

15. The dimming control circuit of claim 12, further comprising:

a) a second control circuit configured to adjust the length of the switching period in accordance with the first adjustment signal; and b) wherein the first control circuit is configured to adjust the current reference signal in accordance with a second adjustment signal, and the first and second adjustment signals are generated in accordance with the dimming signal.

16. The dimming control circuit of claim 15, wherein a product of duty cycles of the first adjustment signal and the second adjustment signal is proportional to a duty cycle of the dimming signal corresponding to a dimming level.

17. The dimming control circuit of claim 15, wherein the first control circuit comprises:

a) a current reference signal generation circuit configured to receive the second adjustment signal, and to generate the current reference signal correlated to the second adjustment signal; and b) a current mode control circuit configured to generate a first control signal in accordance with the first compensation signal and the sampling signal, and to generate the first control signal in accordance with the second compensation signal and the sampling signal during a second time interval of the switching period.

18. The dimming control circuit of claim 17, wherein the current mode control circuit comprises:

a) a transconductance operational amplifier configured to receive the current reference signal and the sampling signal;

b) a first switch having a first terminal coupled to an output terminal of the transconductance operational amplifier, and a control terminal for receiving a clock signal; and c) a comparison circuit having a first input terminal for receiving the sampling signal, a second input terminal coupled to a second terminal of the first switch, and an output terminal for generating the first control signal.

19. The dimming control circuit of claim 15, wherein the second control circuit comprises:

a) a first ramp circuit configured to generate a first ramp signal with a first slop during the first time interval;

b) a second ramp circuit configured to generate a second ramp signal with a second slop during the first and second time intervals, wherein the second ramp signal is proportional to a duty cycle of the first adjustment signal;

c) a comparison circuit configured to generate a pulse signal when the second ramp signal reaches the first ramp signal; and d) an AND-gate configured to generate a second control signal in accordance with a clock signal and the pulse signal, in order to adjust the length of the switching period.

20. The dimming control circuit of claim 11, further comprising a clock signal generation circuit configured to generate a clock signal using a drive signal of a power switch of the power converter, wherein the switching period of the power converter is equal to a period of the clock signal.

* * * * *